(12) United States Patent
Chang

(10) Patent No.: US 7,800,906 B2
(45) Date of Patent: Sep. 21, 2010

(54) ELECTRONIC DEVICE AND HEAT DISSIPATION UNIT THEREOF

(75) Inventor: Shih-Ho Chang, Taipei Hsien (TW)

(73) Assignee: Giga-Byte Technology Co., Ltd., Taipei (TW)

( * ) Notice: Subject to any disclaimer, the term of this patent is extended or adjusted under 35 U.S.C. 154(b) by 0 days.

(21) Appl. No.: 12/257,654

(22) Filed: Oct. 24, 2008

(65) Prior Publication Data

US 2010/0020504 A1 Jan. 28, 2010

(30) Foreign Application Priority Data

Jul. 22, 2008 (TW) ............................... 97127778 A

(51) Int. Cl.
*H05K 7/20* (2006.01)

(52) U.S. Cl. ........................ 361/700; 361/696; 361/697; 361/698; 361/699; 361/701; 174/15.2; 165/80.4; 165/104.26; 165/104.33

(58) Field of Classification Search ........................ None
See application file for complete search history.

(56) References Cited

U.S. PATENT DOCUMENTS

| | | | |
|---|---|---|---|
| 6,504,719 B2 * | 1/2003 | Konstad et al. | 361/698 |
| 6,804,117 B2 * | 10/2004 | Phillips et al. | 361/700 |
| 6,989,990 B2 * | 1/2006 | Malone et al. | 361/699 |
| 7,231,961 B2 * | 6/2007 | Alex et al. | 165/80.4 |
| 7,277,282 B2 * | 10/2007 | Tate | 361/697 |
| 7,277,286 B2 * | 10/2007 | Lee | 361/700 |
| 7,372,698 B1 * | 5/2008 | Tilton et al. | 361/701 |
| 7,440,278 B2 * | 10/2008 | Cheng | 361/699 |
| 7,474,527 B2 * | 1/2009 | Wu | 361/679.48 |
| 7,619,889 B2 * | 11/2009 | Yu et al. | 361/699 |
| 2006/0139880 A1 | 6/2006 | Tate | |
| 2007/0242438 A1 * | 10/2007 | Belits et al. | 361/700 |
| 2008/0218963 A1 | 9/2008 | Wu | |
| 2009/0027856 A1 * | 1/2009 | McCoy | 361/699 |

* cited by examiner

*Primary Examiner*—Boris L Chervinsky
(74) *Attorney, Agent, or Firm*—Birch, Stewart, Kolasch & Birch, LLP

(57) ABSTRACT

An electronic device and a heat dissipation unit thereof are provided. The electronic device includes a housing, a circuit board, a heat source, a heat dissipation system and a heat dissipation unit. The circuit board is disposed in the housing and the heat source is disposed on the circuit board. The heat dissipation abuts the heat source, and the heat dissipation unit, disposed on the housing, abuts the heat dissipation system, wherein a portion of the heat dissipation unit is exposed outside of the housing. The heat dissipation unit includes a connecting portion, a heat exchanger, and a heat pipe. The connecting portion, disposed in the housing, abuts the heat dissipation system. The heat exchanger is disposed in the housing, and a portion of the heat exchanger is exposed outside of the housing. The heat pipe connects the connecting portion with the heat exchanger.

11 Claims, 4 Drawing Sheets

ELECTRONIC DEVICE AND HEAT DISSIPATION UNIT THEREOF

CROSS REFERENCE TO RELATED APPLICATIONS

This Application claims priority of Taiwan Patent Application No. 97127778, filed on Jul. 22, 2008, the entirety of which is incorporated by reference herein.

BACKGROUND OF THE INVENTION

1. Field of the Invention

The present invention relates to an electronic device, and in particular, to an electronic device comprising additional heat dissipation ability.

2. Description of the Related Art

In conventional electronic devices, heat dissipation systems are provided to dissipate heat produced by the heat sources within the electronic devices. The heat dissipation system utilizes a heatsink to abut a heat source directly, thus transmitting heat from the heat source to the heatsink. Next, air convection is conducted within the electronic device by using a system fan, exhausting heat accumulated in the heatsink.

However, with continued technological development, significant heat is generated by electronic devices, due to increased performance, thus, decreasing efficiency of the conventional heat dissipation system. In other words, new electronic devices must be assembled with more powerful heat dissipation mechanisms, to efficiently dissipate heat.

BRIEF SUMMARY OF THE INVENTION

Accordingly, an electronic device is provided. The electronic device includes a housing, a circuit board, a heat source, a heat dissipation system and a heat dissipation unit. The circuit board is disposed in the housing and the heat source is disposed on the circuit board. The heat dissipation system abuts the heat source, and the heat dissipation unit, disposed on the housing, abuts the heat dissipation system, wherein a portion of the heat dissipation unit is exposed outside of the housing.

The invention further provides a heat dissipation unit. The heat dissipation unit includes a connecting portion, a heat exchangers and a heat pipe. The connecting portion, disposed in the housing, abuts the heat dissipation system. The heat exchanger is disposed in the housing, and a portion of the heat exchanger is exposed outside of the housing. The heat pipe connects the connecting portion with the heat exchanger.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
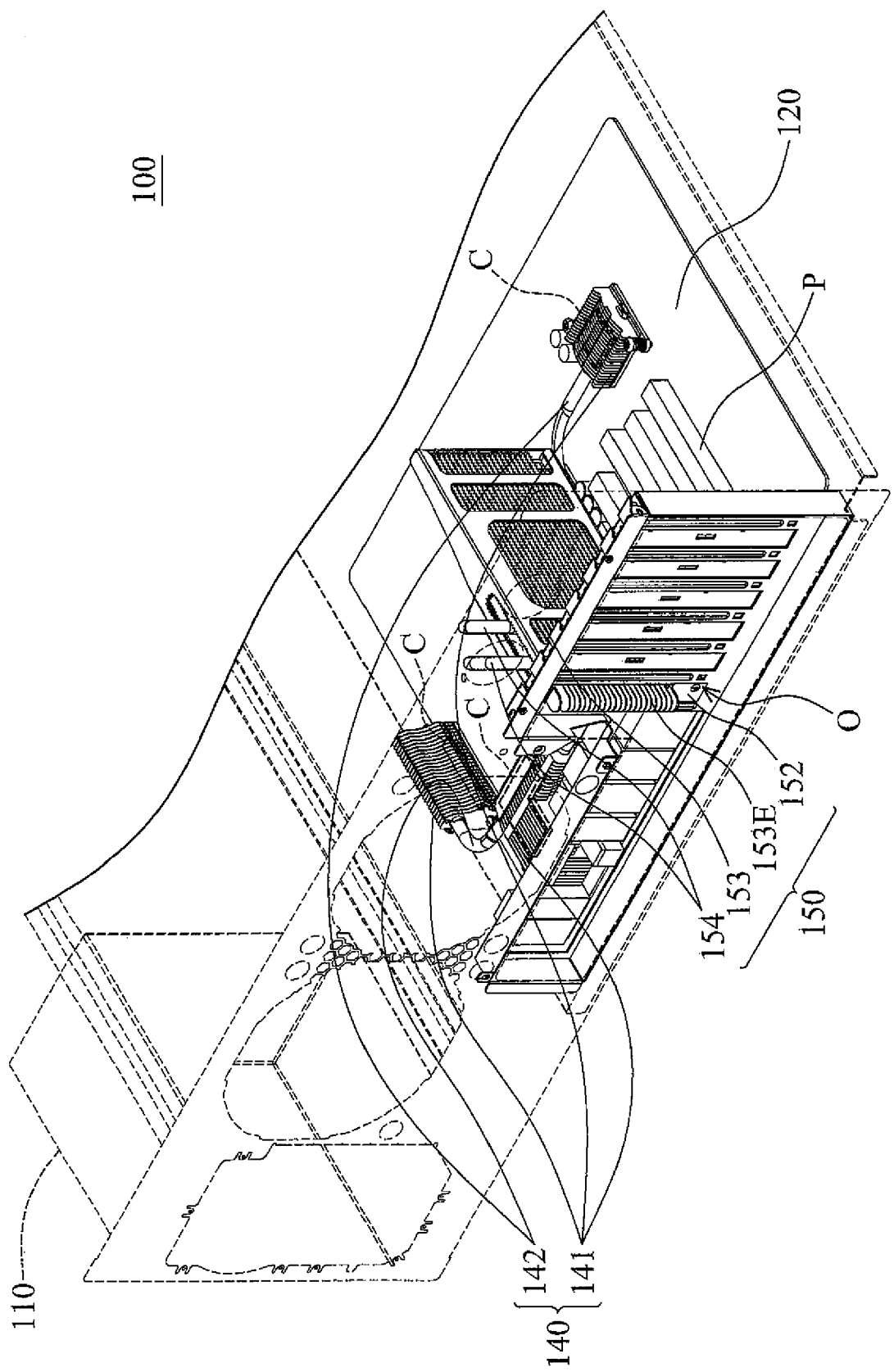
FIG. 1 is a schematic view of an electronic device of the invention.

Referring to FIG. 1, the electronic device 100 comprises a housing 110, a circuit board 120, a heat dissipation system 140, a heat dissipation unit 150 and a plurality of heat sources C. In particular, the heat dissipation unit 150 is a supporting heat dissipation mechanism to enhance the heat dissipation efficiency of the overall system.

The circuit board 120 is disposed in the housing 110. The plurality of heat sources C are distributed on the circuit board 120. Through application of the heat dissipation system 140, heat generated by the heat sources C is therefore dissipated. The heat dissipation system 140 comprises a plurality of heatsinks 141 and a plurality of first heat pipes 142. The number of heatsinks 141 is selected according to the number of heat sources C. In the embodiment, the electronic device 100 comprises four heat sources C four heatsinks 141, but it is not limited thereto.

The heatsinks 141 abut the heat sources C, respectively, such that heat from the heat sources C is able to transmit to the heatsinks 141. Additionally, every heatsink 141 is interconnected by one or two first heat pipes 142, allowing every heatsink 141 to achieve an average temperature. As a result, none of the heat sources C would be burned due to overheating. Next, a system fan is utilized for air convection within the housing 100, and further exhaust heat.

Figure 4:
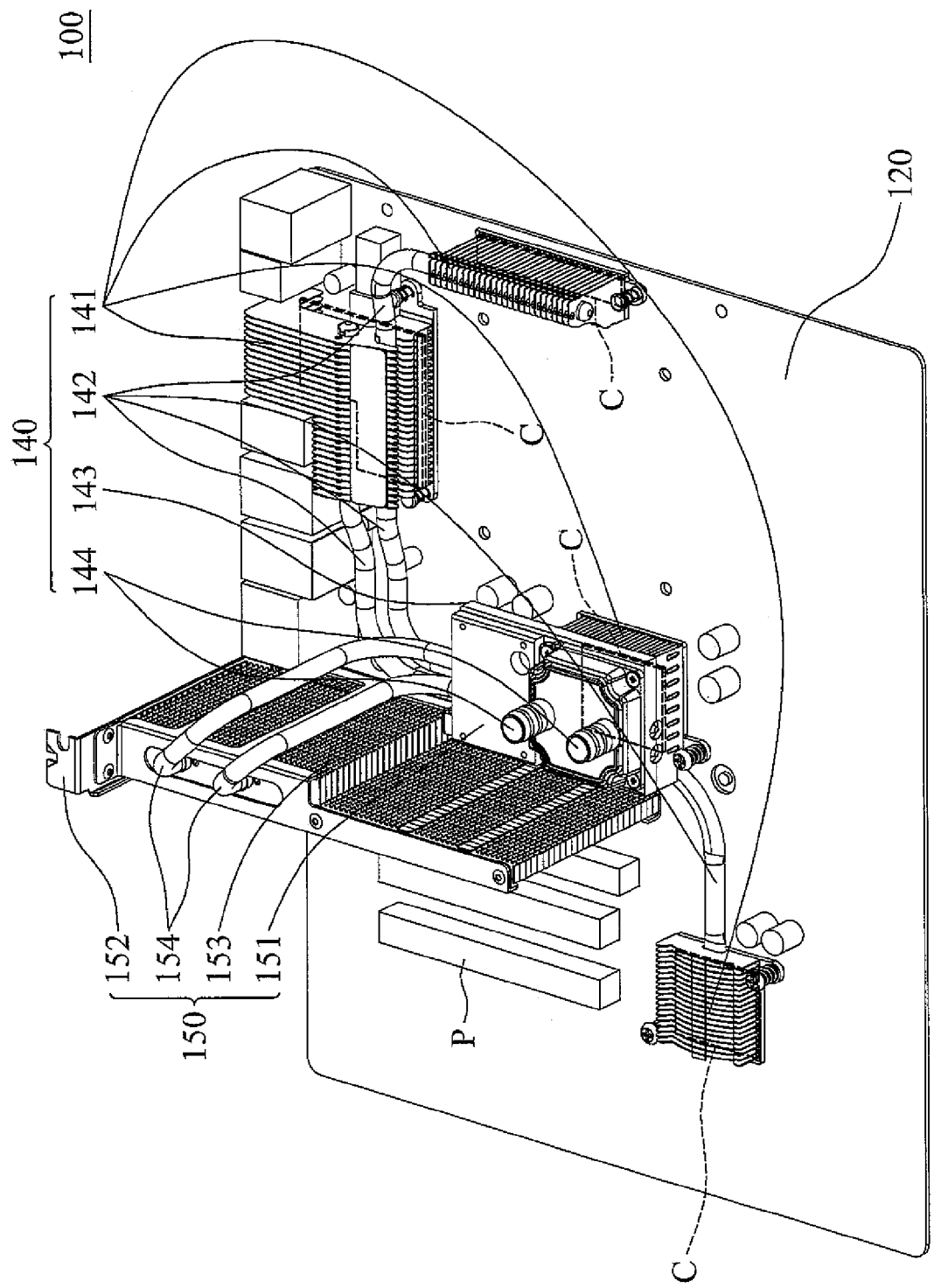
FIG. 4 is a schematic View of the electronic device from another perspective, after application of the heat dissipation unit.

In addition to generating air convection to dissipate heat, the heat dissipation system 140 further comprises a water block 144 and a water-cooling system (not shown), as shown in FIG. 4. The water block 144 is disposed on any of the heatsinks 141. The water-cooling system is disposed outside of the housing 110, communicated with the water block 144. The heat accumulated in the heatsinks 141 is able to be transmitted to the water-cooling system through the circulating cooling fluid, and then dissipated.

Figure 2:
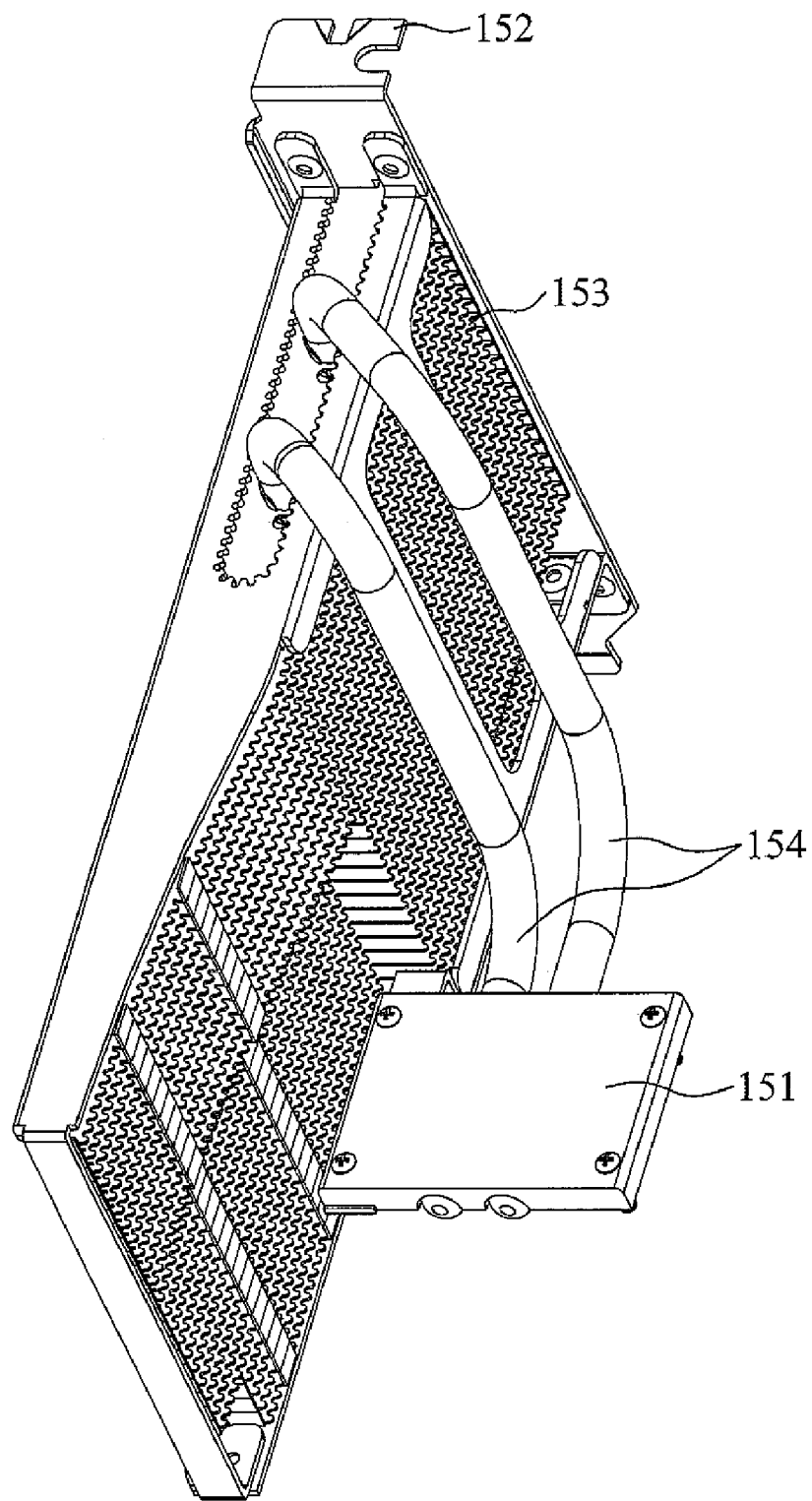
FIG. 2 is a schematic view of a heat dissipation unit of the invention.

Referring to FIGS. 1 and 2, the housing 110 has an aperture O. The heat dissipation unit 150, disposed in the housing 110, is adjacent to a PCI-E slot P, and a portion of the heat dissipation unit 150 is exposed outside of the housing 110. The heat dissipation unit 150 comprises a connecting portion 151, a fastening portion 152, a heat exchanger and two second heat pipes 154.

The connecting portion 151 connects with the heat dissipation system 140. The second heat pipes 154 function to connect the connecting portion 151 and the heat exchanger. The fastening portion 152 is fixed on the periphery of the aperture O of the housing 110. The heat exchanger connects with the fastening portion 152, such that the heat exchanger is also fixed on the housing 110 by the fastening portion 152, and is therefore mounted in the housing 110. Additionally, the heat exchanger comprises a plurality of stacked fins 153, and each of the fins 153 comprises an end portion 153E (as shown in FIG. 1). When the heat exchanger is fixed on the housing 110 by the fastening portion 152, the end portion 153E of each fin 153 is exposed outside of the housing 110.

It should be noted that in the embodiment the heat dissipation unit 150 is disposed in the spare space adjacent to the PCI-E slot P, utilizing the empty space around the PCI-E slot P. Therefore, heat dissipation efficiency is significantly enhanced without increasing the overall volume of the electronic device 100. However, the embodiment is not limited thereto. The heat dissipation unit 150 can be disposed at any position within the housing 110, and only the alteration of the length of the second heat pips 154 is required to connect the connecting portion 151 with the heat dissipation system 140.

Figure 3:
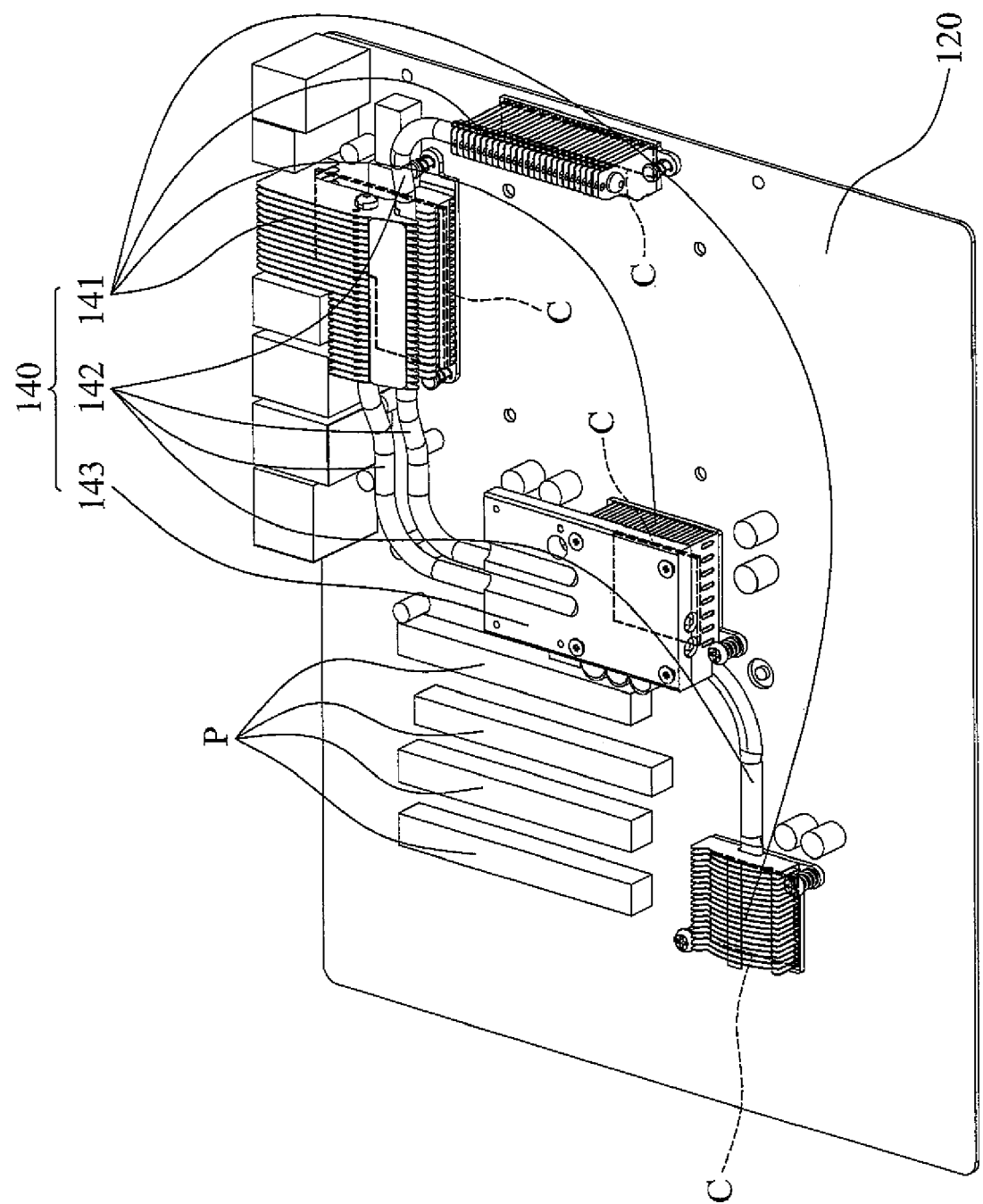
FIG. 3 is a schematic view of the electronic device from another perspective, before application of the heat dissipation unit.

As shown in FIGS. 3 and 4, the housing 110 is excluded to clearly show the interior of the electronic device 100. FIG. 3 depicts the electronic device 100 before application of the heat dissipation unit 150, and FIG. 4 depicts the electronic device 100 after application of the heat dissipation unit 150.

Referring to FIG. 3, the heat dissipation system 140 further comprises a corresponding connecting portion 143 for connecting the heat dissipation unit 150 with the heat dissipation system 140. The corresponding connecting portion 143 is disposed on any of the heatsinks 141 to abut the connecting portion 151 of the heat dissipation unit 150. The corresponding connecting portion 143 comprises two grooves to accommodate the two second heat pipes 154.

It should be noted that in the embodiment the corresponding portion 143 is disposed on one of the heatsinks 141, but it is not limited thereto. The corresponding connecting portion 143 can also be disposed on the first heat pipe 142, as long as the conduction of heat from in the heat dissipation system 140 to the heat dissipation unit 150 is successfully achieved.

Referring to FIG. 4, when the connecting portion 151 is assembled to the corresponding connecting portion 143, the second heat pipes 154 are clamped therebetween. Thus, heat accumulated in the heat dissipation system 140 is transmitted to the heat exchanger through the connecting portion 151 and the second heat pipes 154, and is then exhausted to the exterior through the exposed end portions 153E of the fins 153, increasing overall heat dissipation efficiency.

For the electronic device 100 of the invention, in addition to heat being dissipated through the heat dissipation system 140, heat is also dissipated through the heat dissipation unit 150 connected to the heat dissipation system 140 to speed up heat dissipation efficiency. Because a portion of the heat dissipation unit 150 is exposed outside of the housing 110, directly exposed to the atmosphere, heat accumulated within the heat dissipation system 140 is efficiently transmitted to the exterior of the housing 110. Moreover, the heat dissipation unit 150 is disposed in the unused space within the housing 110, such that reconfiguration of the components within the housing 110 is not required, and the overall size of the electronic device 100 can be retained.

While the present invention has been described by way of example and in terms of preferred embodiment, it is to be understood that the present invention is not limited thereto To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device, comprising
    a housing;
    a circuit board disposed in the housing;
    a heat source disposed on the circuit board;
    a heat dissipation system abutting the heat source; and
    a heat dissipation unit disposed on the housing and abutting the heat dissipation system, comprising:
        a connecting portion abutting the heat dissipation system;
        a heat exchanger connected to the connecting portion and comprising a plurality of fins;
        wherein a portion of the fins of the heat dissipation unit is extended from interior of the housing to exterior of the housing being exposed outside of the housing.

2. The electronic device as claimed in claim 1, wherein the amount of the heat sources are plural, and the heat dissipation system comprises a plurality of heatsinks abutting the heat sources, respectively.

3. The electronic device as claimed in claim 2, wherein the heat dissipation system comprises a plurality of first heat pipes connecting with the heat sinks, respectively.

4. The electronic device as claimed in claim 1, wherein the heat dissipation unit comprises:
    a fastening portion fixed on the housing connecting to the heat exchanger;
    a second heat pipe connecting the connecting portion with the heat exchanger.

5. The electronic device as claimed in claim 1, wherein the housing has an aperture, and end portions of the fins are exposed outside of the housing through the aperture.

6. The electronic device as claimed in claims 1, wherein the housing comprises an aperture, and the portion of the heat dissipation unit is exposed outside of the housing via the opening.

7. The electronic device as claimed in claims 1, wherein the heat dissipation system comprises a corresponding connecting portion abutting the connecting portion of the heat dissipation unit.

8. The electronic device as claimed in claim 1, further comprising a PCI-E slot disposed on the circuit board, wherein the heat dissipation unit is disposed adjacent to the PCI-E slot.

9. A heat dissipation unit, disposed in an electronic device having a heat dissipation system and a housing, comprising
    a connecting portion disposed in the housing and abutting the heat dissipation system;
    a heat exchanger disposed in the housing, and a portion of the heat exchanger being exposed outside of the housing, comprising:
        a connecting portion abutting the heat dissipation system;
        a heat exchanger connected to the connecting portion and comprising a plurality of fins;
        wherein a portion of the fins is extended from interior of the housing to exterior of the housing; and
        a pipe connecting the connecting portion with the heat exchanger.

10. The electronic device as claimed in claim 9, wherein ends of the fins are exposed outside of the housing.

11. The electronic device as claimed in claim 9, further comprising a fastening portion fixed on the housing and connecting to the heat exchanger.

* * * * *